United States Patent
Jeon

Patent Number: 5,686,893
Date of Patent: Nov. 11, 1997

[54] WATER LEAKAGE DETECTING APPARATUS OF WATER PURIFIER

[75] Inventor: Je-Dal Jeon, Suwon, Rep. of Korea

[73] Assignee: Samsung Electronics Co., Ltd., Suwon, Rep. of Korea

[21] Appl. No.: 556,145

[22] Filed: Nov. 9, 1995

[30] Foreign Application Priority Data

Nov. 14, 1994 [KR] Rep. of Korea ............. 94-30247 U

[51] Int. Cl.[6] ........................................... G08B 21/00
[52] U.S. Cl. .................. 340/605; 340/618; 340/620; 210/86; 210/103; 210/104
[58] Field of Search .................. 340/605, 604, 340/608, 607, 618, 620; 210/85, 86, 103, 104; 73/49.2

[56] References Cited

U.S. PATENT DOCUMENTS

| | | | |
|---|---|---|---|
| 4,952,914 | 8/1990 | Mueller | 340/620 |
| 5,099,873 | 3/1992 | Sanchez | 340/605 |
| 5,151,685 | 9/1992 | Spicer et al. | 340/605 |
| 5,229,750 | 7/1993 | Welch, Jr. et al. | 340/605 |

Primary Examiner—Jeffery Hofsass
Assistant Examiner—Julie B. Lieu
Attorney, Agent, or Firm—Burns, Doane, Swecker & Mathis, L.L.P.

[57] ABSTRACT

A water purifier includes filters and a storage tank for storing water purified by the filters. A water detector disposed below the tank detects water leaked from the tank and supplies a corresponding signal to a control mechanism which shuts off the water flow through the purifier, displays a visual indication of leakage, and sounds an audible alarm.

6 Claims, 6 Drawing Sheets

WATER LEAKAGE DETECTING APPARATUS OF WATER PURIFIER

BACKGROUND OF THE INVENTION

1. Field of the Invention

The present invention relates to a water purifier for removing polluted harmful materials contained in potable water such as faucet water or the like to thereby perform a water purifying operation, and more particularly to a water leakage detecting apparatus for detecting water leakage.

2. Description of the Prior Art

Generally, a water purifier serves to eliminate harmful cancer-causing materials contained in the potable water (hereinafter referred to as water) such as faucet water or the like to thereby supply purified water, and purifying methods thereof can be roughly classified into 1 natural filtering method, a directly-connected filtering method, an ion exchange resin method and a reverse osmotic method.

The reverse osmotic method, among others, is adapted to apply pressure to the water to cause the same to pass through a membrane (reverse osmotic filter) which is an artificial osmotic membrane, so that the water purifying can be executed, where heavy metal, bacteria, cancer-causing materials and the like can be separately removed and at the same time, only clean water containing dissolved oxygen can be supplied.

Therefore, the water purified by the reverse osmotic method is being utilized for sophisticated scientific industries or for cleaning hyper precision electronic parts or for medical purposes, and is widely used as a household water purifier of late.

Figure 1:
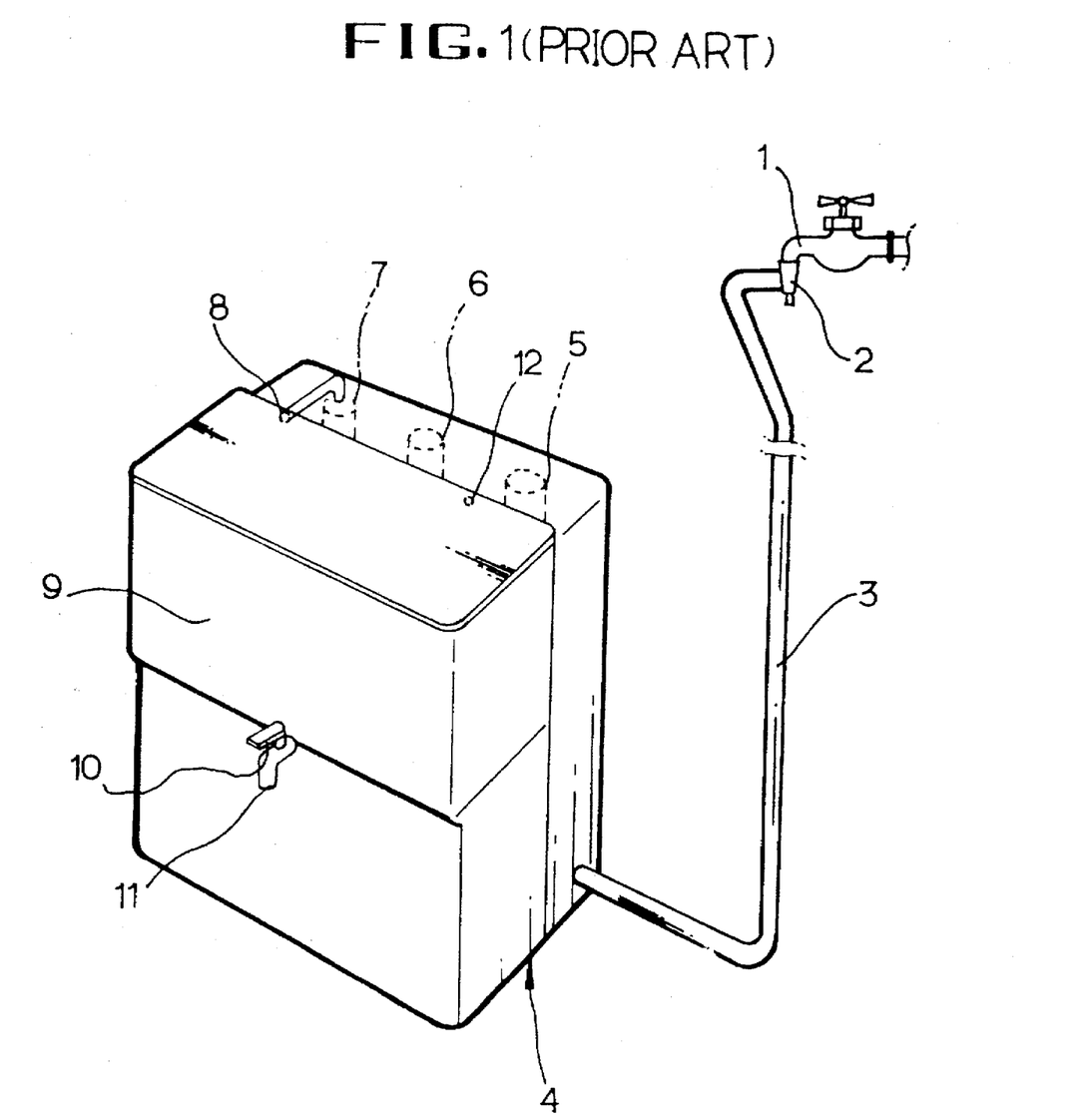
FIG. 1 is an overall perspective view of a water purifier according to the prior art.

Referring to FIG. 1, the water purifier by the conventional reverse osmotic method thus described is so designed that the water such as the faucet water or the like supplied into a supply pipe 3 through an adapter 2 connected to a faucet 1 is separated from various harmful organic chemical substances such as chlorine materials and the like when the water passes through a pre-processing filter 5 disposed at a rear side of a body 4.

The water having passed the pre-processing filter 5 has its supplied water quantity adjusted by a water supply valve (not shown) and at the same time, is increased in pressure to a predetermined level according to the driving of a pressure pump, to thereafter be infused into a membrane section 6.

At this time, the water infused into the membrane section 6 is separated from various heavy metal, cancer-causing material, bacteria and the like when passing through a plurality of membranes (not shown) in the membrane section 6, and the water having passed the membrane section 6 is separated from odor such as harmful gas and the like when passing through a post-processing filter 7.

The purified water having a good taste after being separated from the odor such as the harmful gas and the like while passing through the post-processing filter 7 is supplied into a storage tank 9 through a water supply hole 8.

When the storage tank 9 is supplied with the purified water, a discrimination is made as to whether the quantity of the purified water supplied to the storage tank 9 is at high level (maximum quantity for cutting off the purified water supplied to the storage tank) or at low level (minimum quantity for starting to supply the purified water to the storage tank).

When the quantity of the purified water supplied to the storage tank 9 is at high level, the supplying of purified water is cut off, and when the quantity of the purified water supplied to the storage tank 9 is at low level, the purified water is allowed to be supplied into the storage tank 9, so that a predetermined quantity of purified water can be stored in the storage tank at all times.

Furthermore, the purified water stored in the storage tank 9 is adapted to be dispensed through a disposal outlet 11 by manipulation of a dispencer lever 10.

However, in case a water level detecting sensor for detecting the quantity of the purified water supplied to the storage tank 9 is erroneously operated after being subjected to an impact or the like, the purified water is kept being supplied into the storage tank 9 through the water supply hole 8, thereby causing an overflow. At this time, the water purifier is so constituted that the purified water over flowing from the storage tank 9 can be drained to an overflow pipe by way of a discharge hole 12 formed at a rear surface of the storage tank 9.

However, there is a problem in that the purified water can be continuously supplied into the storage tank to thereby cause waste of the purified water and to cause the periphery of the purifier to be unclean due to leakage, in case the overflow pipe becomes clogged by dust, foreign objects and like as time passes by.

Furthermore, there is another problem in that if water leaks to a storage pan of the body there may occur a danger such as electric leakage and it is difficult for a user to easily discriminate whether there is a leakage until the water is leaked outside, thereby making it impossible to take quick measures when water leakage occurs due to poor sealing of connecting pipes and the like.

SUMMARY OF THE INVENTION

The present invention has been disclosed to solve the aforementioned problems and it is an object of the present invention to provide a water leakage detecting apparatus of a water purifier by which purifying operation can be stopped to thereby generate an alarm for enabling an immediate remedial action, and, at the same time, to make the water purifier hygienical and accident-free, when there occurs water leakage due to poor sealing of connecting pipes through which the water passes and clogging of an overflow pipe for preventing proper drainage of overflowing water.

In accordance with the present invention, the object can be accomplished by a water leakage detecting apparatus of a water purifier employing a storage tank in order to store water purified in a pre-processing filter, membrane and a post-processing filter, the apparatus comprising:

water leakage detecting means for detecting water leakage outside of the storage tank;

control means for receiving a leakage detecting signal detected by the water leakage detecting means to thereby control overall water purifying operations;

display means for receiving a control signal output from the control means according to the leakage detecting signal detected by the leakage detecting means to thereby indicate whether or not there has occurred a leakage; and alarm generating means for receiving the control signal generated from the control means according to the leakage detecting signal detected by the leakage detecting means to thereby generate an alarm for informing an occurrence of water leakage.

BRIEF DESCRIPTION OF THE DRAWINGS

Other objects and aspects of the invention will become apparent from the following description of embodiments with reference to the accompanying drawings in which.

DETAILED DESCRIPTION OF A PREFERRED EMBODIMENT OF THE INVENTION

The preferred embodiment of the present invention will now be described in detail with reference to the accompanying drawings.

Figure 2:
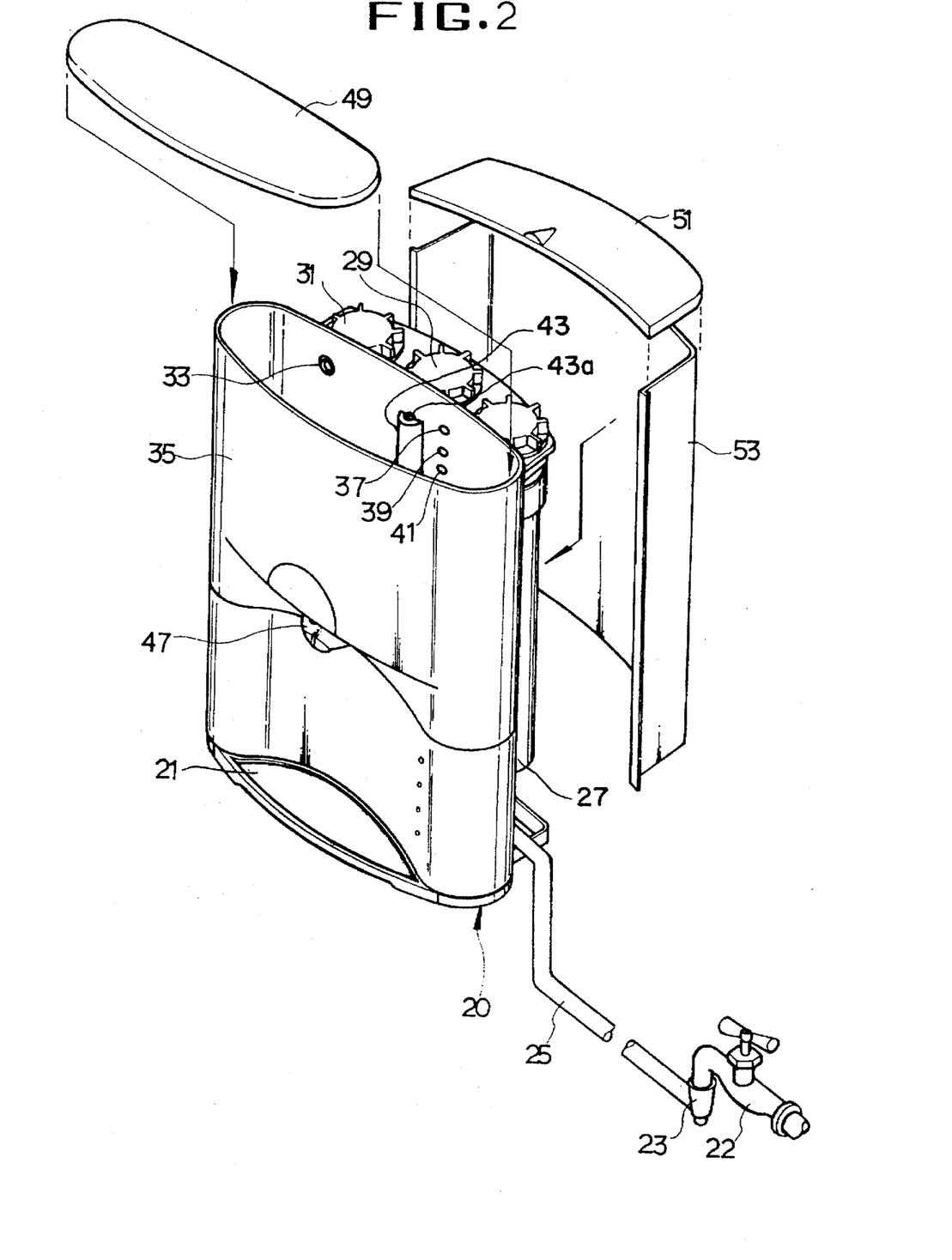
FIG. 2 is an exploded front perspective view of a water purifier according to the present invention.

As illustrated in FIG. 2, reference numeral 20 is a body of the water purifier, a front side of which is formed with a receiving area 21 for receiving vessels such as cups and the like.

The body 20 is connected at a rear side thereof with one end of a water supply pipe 25, with the other end having a connecting unit 23 coupled to a faucet 22.

The one end of the water supply pipe 25 is connected to a pre-processing filter 27 for removing various harmful organic chemical substances such as chlorine component and the like when the water is supplied from the faucet 22 through the connecting unit 23.

Furthermore, the pre-processing filter is connected to a membrane section 29 having therein a plurality of fine filtering membranes (not shown) in order to eliminate various heavy metal, cancer-causing materials, bacteria and the like included in the water which has passed through the pre-processing filter 27.

The membrane section 29 is connected to a post-processing filter 31 for removing odor components such as harmful gas and the like contained in the water which has passed through the membrane section 29.

The body 20 is releasably fitted at an upper side thereof with a storage tank 35 having a water supply hole 33 formed at one end thereof in order to store purified water which has passed through the post-processing filter 31, and the storage tank 35 is provided at an inner rear side thereof with high and low water level detecting sensors 37 and 39 for detecting the quantity of the purified water stored in the storage tank 35.

The high and low water level detecting sensors 37 and 39 are arranged at one side of a discharge hole 43a for draining out the purified water through an overflow pipe or conduit arrangement 43 forming a drainage passage when an overflow occurs due to over-supply of the purified water in the storage tank 35.

The storage tank 35 is frontally coupled to a dispenser lever 47 for discharging the purified water from the storage tank 35 through a dispensing outlet (not shown). The body 20 is coupled at an upper side thereof with upper lids 49 and 51 and is coupled at a rear side thereof with a rear cover 53.

Reference numeral 41 designates a ground terminal.

Figure 3:
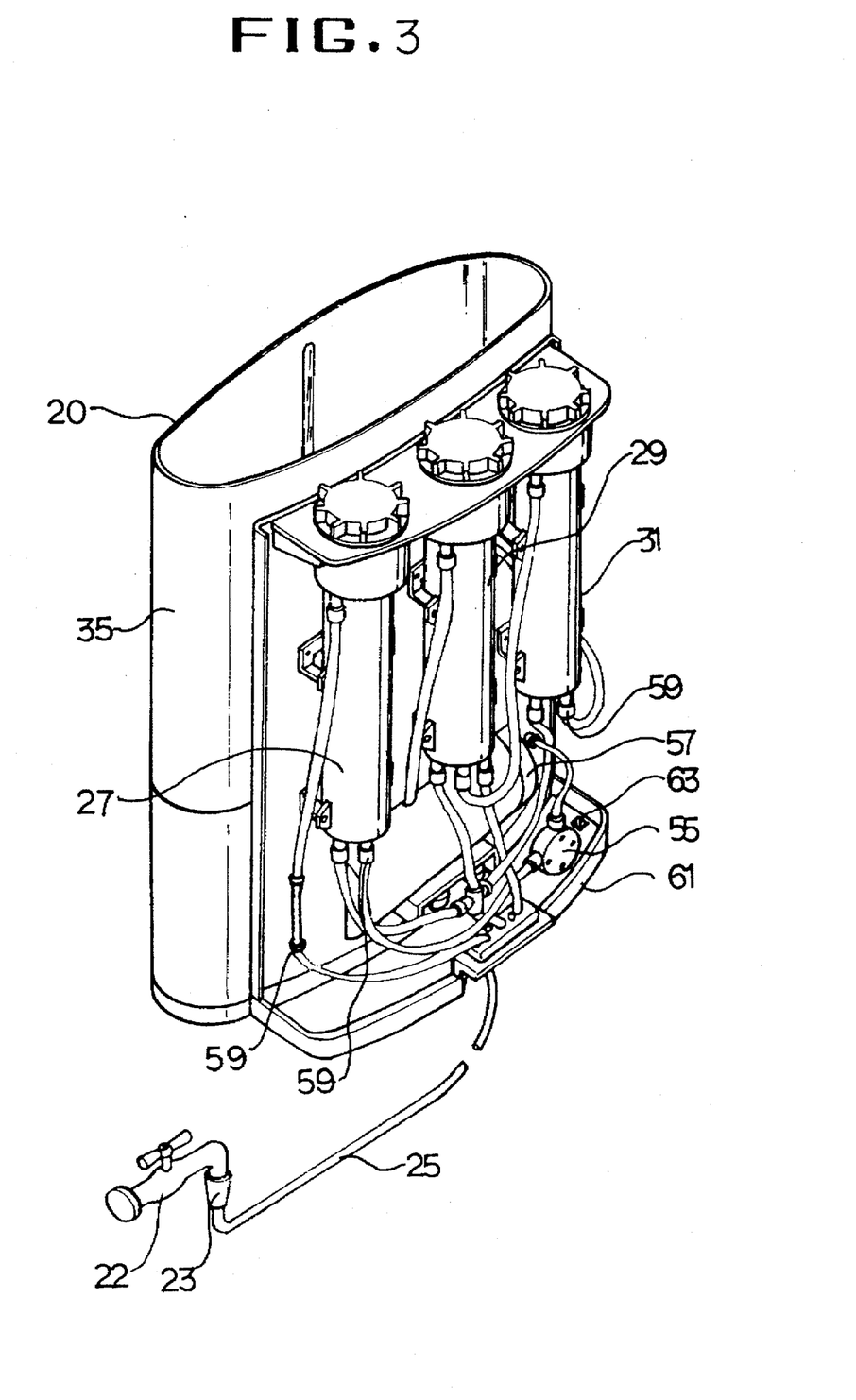
FIG. 3 is a rear perspective view of a water purifier according to the present invention.

As illustrated in FIG. 3, the lower (outlet) end of the post-processing filter 31 is connected to a water supply valve 55 which is opened and closed according to the water level of the storage tank 35, i.e., according to the stored water quantity in the storage tank 35.

The water supply valve 55 is connected to a pressure pump 57 which serves to increase to a predetermined level the pressure of the water infused into the membrane section 29 from the pre-processing filter 27.

Furthermore, the water supply valve 55 is disposed adjacent a water leakage detecting sensor 63 which serves to detect occurrence of water leakage into a storage pan 61 of the body 20 when the overflow pipe 43 is clogged by dust, foreign objects and the like or when the water leaks due to poor sealing of the connecting pipe and the like through which the water passes in the water purifying process from the faucet 22 to the storage tank 35.

Figure 4:
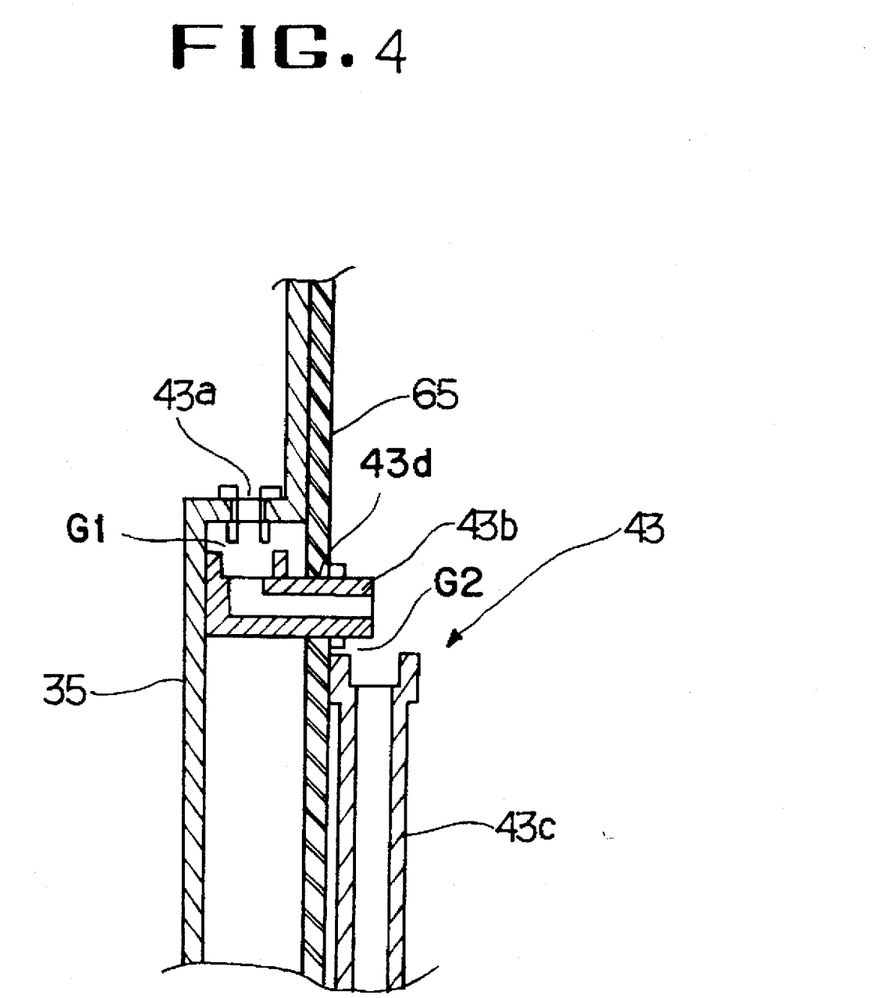
FIG. 4 is a sectional view of an overflow pipe according to the present invention.

Referring to FIG. 4, the overflow pipe 43 for discharging the purified water in the storage tank 35 when the overflow occurs in the storage tank 35 includes an "L" shaped guiding pipe 43b for discharging the purified water in the storage tank 35, while the guiding pipe 43b is coupled to a bracket 65 through a hole 43d formed therein while a drain pipe 43c for draining out the purified water discharged through the guiding pipe 43b is fixed to the bracket 65 at a lower end of the guiding pipe 43b. A gap G1 is formed between the discharge hole 43a and the pipe 43b, and a gap G2 is formed between the pipes 43b and 43c.

The discharge hole 43a is formed at a rear surface of the storage tank 35 and the bracket 65 is coupled to a rear side of the storage tank 35.

Now, a block diagram for illustrating the control of a water leakage detecting operation of a water purifier thus constructed will be described in detail with reference to FIGS. 5 and 6.

Figure 5:
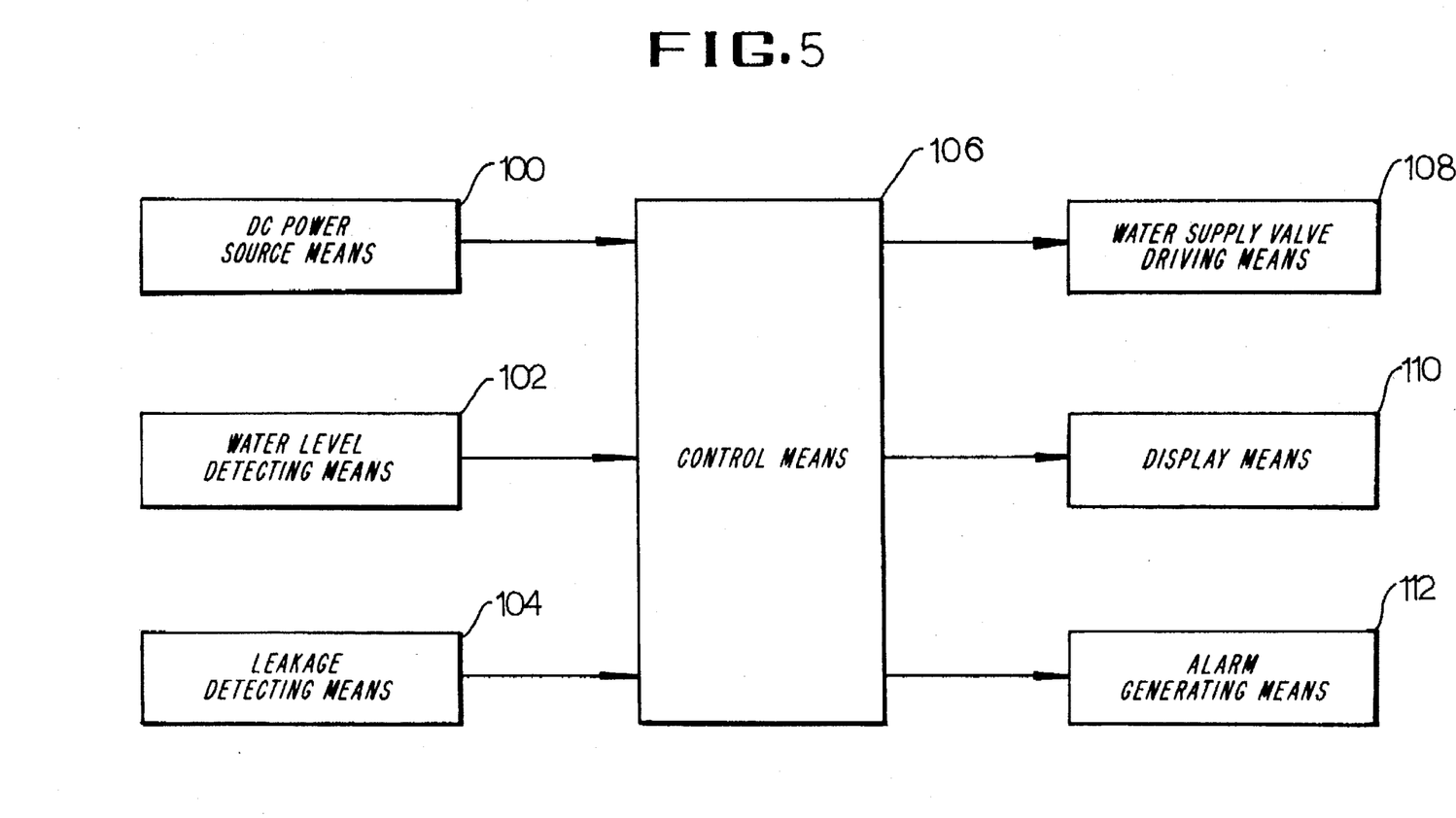
FIG. 5 is a control diagram for a water leakage detecting unit of a water purifier according to the present invention.
Figure 6:
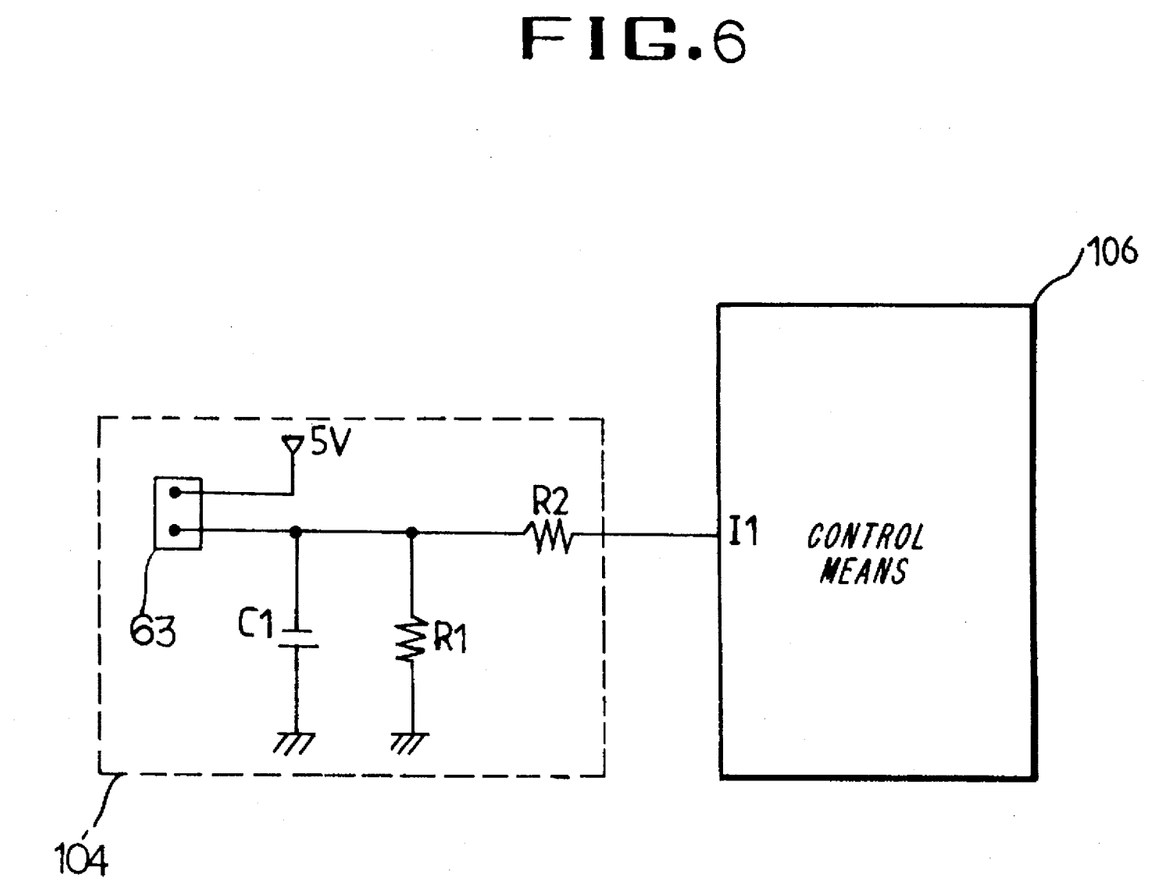
FIG. 6 is a detailed circuit for a water leakage detecting unit of a water purifier according to the present invention.

As illustrated in FIGS. 5 and 6, direct current DC power source means 100 serves to receive power source voltage of a commercial alternating current AC power source supplied from an alternating current AC power source input terminal (not shown) to convert the same to a predetermined DC voltage necessary for operation of the water purifier and to thereby output the same.

Water level detecting means 102 comprises high and low water level detecting sensors 37 and 39 for detecting the water level of the storage tank 35, i.e., for detecting the purified water quantity stored in the storage tank 35.

Water leakage detecting means 104 serves to detect the occurrence of water leakage outside of the storage tank 35 due to clogging of the overflow pipe 43 equipped in the storage tank or due to poor sealing of the connecting pipe 59 through which the water passes. The water leakage detecting means 104 includes the water leakage detecting sensor 63 for being disposed at a predetermined position of the storage pan 61 to thereby be turned on or turned off so that water leakage to the storage pan 61 in the body 20 can be detected and resistors R1 and R2 and a capacitor C1 for being connected to a terminal at one side of the water leakage detecting sensor 63 in order to prevent erroneous operation of the water leakage detecting sensor 63 due to noise from the outside.

Furthermore, control means 106 is a microcomputer which serves to receive DC voltage output from the DC power source means 100 to initialize the water purifier operation and to discriminate whether or not there is any leakage at the water purifier by receiving a water leakage signal detected by the water leakage detecting means 104, so that overall water purifying operations can be controlled.

Water supply valve driving means 108 serves to receive a control signal output from the control means 106 according to the water level of the storage tank 35 detected by the water level detecting means 102 to controllably drive the water supply valve 55, so that the supply of water coming from the faucet 22 through the water supply pipe 25 can be controlled.

Display means 110 is adapted to receive the control signal generated from the control means 106 according to the water leakage detecting signal detected by the water leakage detecting means 104 to flicker a red light emitting diode LED (green LED during normal times), so that the occurrence of water leakage in the water purifier can be indicated.

Alarm generating means 112 serves to receive the control signal output from the control means 106 according to the water leakage detecting signal detected by the water leakage detecting means 104 to generate an alarm so that an announcement of whether or not there has occurred a water leakage can be made.

Now, the operation effect of the water leakage detecting apparatus of a water purifier thus constructed will be described.

First of all, when power is applied to the water purifier, the DC power source means 100 converts the power source voltage of commercial AC power source supplied from the AC power source input terminal (not shown) to a predetermined DC voltage necessary for driving the water purifier, thereby outputting the same to respective driving circuits and the control means 106.

Accordingly, the control means 106 receives the DC voltage output from the DC power source means 100 and initializes the water purifier.

At this time, the stored water quantity in the storage tank 35, in other words, the water level of the storage tank 35 is detected by the water level detecting means 102 which comprises high and low water level detecting sensors 37 and 39, and the water level data detected therefrom is output to the control means 106.

The control means 106 now prevents the water purifying operation until the water level in the storage tank 35 drops to a low level if it is determined that the water level of the storage tank 35 detected by the detecting sensors 37 and 39 is above the low water level (because there is no need to supply the purified water into the storage tank 35).

When the water level in the storage tank 35 drops to below the low water level with lapse of time, the low water level detecting sensor 39 detects the change thereof and the water level data detected therefrom is output to the control means 106.

Accordingly, the control means 106 outputs the control signal to the water supply valve driving means 108 in order to perform the water purifying operation for supplying the purified water to the storage tank 35.

The water supply valve driving means 108 serves to supply power source voltage to water supply valve 55 according to the control of the control means 106, to thereby open the water supply valve 55.

When the water supply valve 55 is opened, the water such as faucet water and the like starts to be supplied into the water supply pipe 25 through the connecting unit 23 from the faucet 22.

The water supplied from the water supply pipe 25 is separated various harmful organic chemical substances such as chlorine substance and the like in the course of passing through the pre-processing filter 27, and the water which has passed through the pre-processing filter 27 is infused into the membrane section 29 through the water supply valve 55.

The water infused into the membrane section 29 is increased in pressure to a predetermined level according to driving of the pressure pump 57 to thereafter pass through the membrane section 29.

The water infused into the membrane section 29 penetrates a plurality of fine membranes formed with the membrane section 29 and is separated from various heavy metal, cancer-causing materials, bacteria and the like contained in the water.

The water which has passed through the membrane section 29 passes in turn through a post-processing filter 31 to thereby be separated from odor such as harmful gas and the like and is supplied into the storage tank 35 through the water supply hole 33.

At this time, the quantity of the purified water supplied into the storage tank 35 through the water supply hole 33, in other words, the water level in the storage tank 35 is detected by the high water level detecting sensor 37 and water level data detected therefrom is output to the control means 106.

Accordingly, the control means 106 outputs a control signal to the water supply valve driving means 108 to stop supplying the purified water to the storage tank 35, when the water level in the storage tank 35 detected by the high water level detecting sensor 37 is full, so that the water supply valve driving means 108 cuts off the power voltage applied to the water supply valve 55 according to the control of the control means 106, thereby closing the water supply valve 55.

When the water supply valve 55 is closed, supply of the water to the water supply pipe 25 from the faucet 22 is cut off, so that there is no more supply of the purified water to the storage tank 35.

Successively, the water supply valve driving means 108 receives the control signal output from the control means 106 according to the water level in the storage tank detected by the high and low water level detecting sensors 37 and 39, to thereby control closing and opening operations of the water supply valve 55, so that a predetermined quantity of purified water can be stored in the storage tank 35.

Thereafter, the user can operate the dispenser lever 47 connected to a front surface of the storage tank 35, to thereby allow the purified water in the storage tank 35 to be discharged through a dispensing hole (not shown) for drinking.

Meanwhile, when the full water level in the storage tank 35 is not detected due to erroneous operation of the high water level detecting sensor 37, the purified water is continuously supplied to the storage tank 35 to thereby cause an overflow.

When the overflow occurs from the storage tank 35, the purified water is discharged to the guiding pipe 43b through the discharge hole 43a formed at an inner rear surface of the storage tank 35 and the purified water discharged through the guiding pipe 43b is drained out through the discharge pipe 43c.

However, in case the guiding pipe 43b or the discharge pipe 43c through which the overflowed purified water in the storage tank 35 passes is somehow clogged due to dust, foreign objects and the like being stuffed therein as the time lapses, the purified water starts to be leaked out to the storage pan 61 through the gap G1 or G2.

The purified water can be leaked to the storage pan 61 not only when the guiding pipe 43b or the discharge pipe 43c is clogged, but also when respective connecting pipes 59 are not tightly sealed through which the water supplied from the faucet 22 passes in the course of being purified while passing through the plurality of filters.

When the leakage to the storage pan 61 starts to happen due to clogging of the guiding pipe 43b or the discharge pipe 43c or due to improper sealing of the connecting pipes 59, the water leakage detecting sensor 63 disposed at the storage pan 61 is energized, though same remains deenergized at normal times, and the voltage (5 V) output from the DC power source means 100 is input to an input terminal 11 of the control means 106 through a resistor R2.

Accordingly, the control means 106 determines whether there is any leakage according to the voltage signal of high level input from the input terminal 11 and supply a control signal to the water supplies valve driving means 108 in order to stop the water purifying operation of the water purifier.

Consequently, the water supply valve driving means 108 cuts off the power voltage applied to the water supply valve 55 according to the control of the control means 106, to thereby close the water supply valve 55, so that the water supplied into the water supply pipe 25 from the faucet 22 can be terminated.

At this time, the control means 106 serves to generate a control signal to the display means 110 and the alarm generating means 112 in order to advise the user that there is water leakage.

Accordingly, the display means 110 serves to flicker the red LED of power source lamp according to the control of the control means 106 to thereby indicate that there occurs water leakage, and the alarm generating means 112 functions to generate alarms or melodies according to the control of the control means 106 to thereby advise of the occurrence of the water leakage.

As seen from the foregoing, there is an advantage in that the water leakage detecting apparatus of a water purifier according to the present invention can automatically cut off the water purifying operation when there occurs water leakage due to clogging of an overflow pipe or due to improper sealing of connecting pipes through which the water passes, to thereby generate alarms, so that swift counter-measures to stop the leakage can be taken and accidents can be avoided.

Having described a specific preferred embodiment of the invention with reference to the accompanying drawings, it is to be understood that various changes and modifications may be effected therein by one skilled in the art without departing from the scope or spirit of the invention as defined in the appended claims.

What is claimed is:

1. A water purifier, comprising:

a filtering section adapted to be connected to a source of water under pressure for purifying water received therefrom;

a water storage tank for storing purified water;

a conduit connecting the water storage tank to the filtering section for conducting purified water from the filtering section to the water storage tank;

an electrically actuated valve for terminating a supply of purified water to the water storage tank;

a first sensor for detecting a maximum allowed water level in the tank and emitting a first signal indicating that water has reached the maximum allowed level;

a water discharge hole formed in the storage tank for discharging excess water from the storage tank when the water level exceeds the maximum allowed level;

a water drainage conduit arrangement defining a drainage passage communicating with the discharge hole and being normally open for conducting-away the excess water, the conduit arrangement including means permitting backed-up water in the passage to flow out of the passage in the event of the passage becoming clogged;

a pan arranged to collect the backed-up water flowing out of the passage;

a second detector for detecting the presence of water in the pan, the second detector emitting a second signal indicating the presence of water in the pan;

a controller connected to the valve and to the first and second detectors, for closing the valve in response to receipt of either of the first and second signals; and a visual display and an audio alarm both connected to the controller to be activated thereby in response to the controller receiving the second signal.

2. The water purifier according to claim 1, wherein the filtering section includes a pre-processing filter, a membrane section and a post-processing, all filters arranged in series, the post-processing filter connected to the tank.

3. The water purifier according to claim 1, wherein the tank includes a dispensing outlet and a hand-actuated dispenser.

4. The water purifier according to claim 1; wherein the water detector is disposed below the tank.

5. The water purifier according to claim 1, wherein the conduit arrangement forms a gap in the passage to define the means permitting backed-up water to flow out of the passage, the gap communicating with the pan.

6. The water purifier according to claim 1, wherein the conduit arrangement comprises a first pipe for receiving water from the discharge hole, and a second pipe for receiving water from the first pipe, there being a first gap between the discharge hole and the first pipe, and a second gap between the first and second pipes, each of the first and second gaps defining the means permitting backed-up water to flow out of the passage, both of first and second gaps communicating with the pan.

* * * * *